Figure 1:
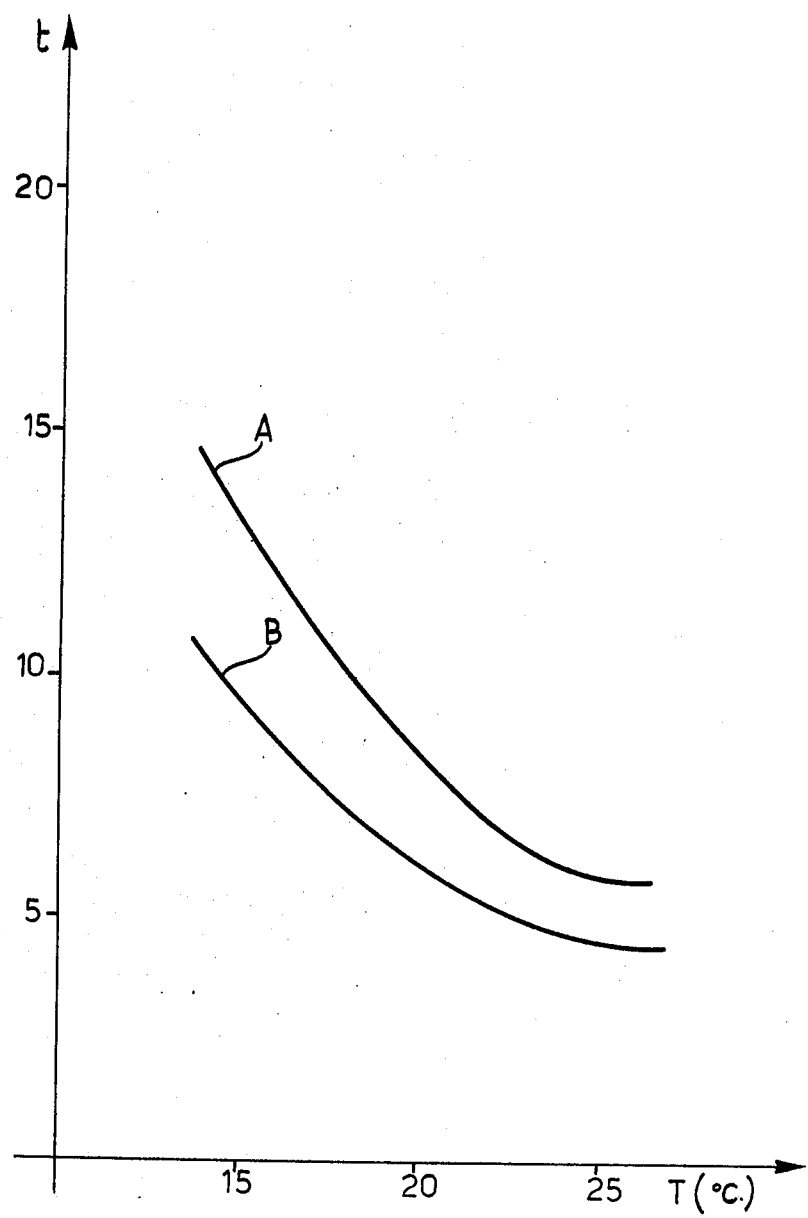

United States Patent [19]

Cavanna et al.

[11] 4,308,687
[45] Jan. 5, 1982

[54] APPARATUS FOR DETECTING CLIMATIC CONDITIONS FAVORING THE DEVELOPMENT OF PERONOSPORALES

[75] Inventors: Giancarlo Cavanna, Borgo S. Dalmazzo; Gian Paolo Tavoni, Cambiano, both of Italy

[73] Assignee: Centro Ricerche Fiat S.p.A., Turin, Italy

[21] Appl. No.: 162,992

[22] Filed: Jun. 25, 1980

[30] Foreign Application Priority Data

Jul. 18, 1979 [IT]   Italy ............................. 68491 A/79

[51] Int. Cl.³ .......................................... A01G 1/00
[52] U.S. Cl. ................................. 47/1 R; 47/17; 47/58
[58] Field of Search .................... 239/67–72, 239/75; 47/1, 17, 58

[56] References Cited

U.S. PATENT DOCUMENTS 3,905,153  9/1975  Enter ................................... 47/58
4,015,366  4/1977  Hall ................................... 47/1 R
4,091,566  5/1978  Horvath et al. ...................... 47/17

OTHER PUBLICATIONS

A Computer-Controlled Greenhouse———Kobayashi, JEE, Apr. 1977, #124.

Primary Examiner—Robert E. Bagwill
Attorney, Agent, or Firm—Sughrue, Mion, Zinn, Macpeak & Seas

[57] ABSTRACT

An infestation of Peronosporales on plant leaves will only fully develop if the leaves experience a period of wetness of a duration sufficient to allow the penetration of zoospores into the stomata of the leaves. The duration of this period is temperature dependent. Apparatus is provided which includes a pulse generator arranged to generate pulses at a rate dependent on the ambient temperature, a signal gate controlled by a leaf wetness sensor to pass the pulses output from the generator only when the leaves are sufficiently wet to favor penetration of the zoospores, and a counter arranged to count the pulses passed by the gate to time a period the duration of which varies with temperature. Upon completion of timing, the counter outputs an infestation signal which causes a monitor counter to start counting the pulses output from the pulse generator whereby to provide an indication of the subsequent advance of the infestation. Successively generated infestation signals are arranged to cause successive monitor counters to start counting thereby enabling several overlapping infestations to be followed.

12 Claims, 2 Drawing Figures

APPARATUS FOR DETECTING CLIMATIC CONDITIONS FAVORING THE DEVELOPMENT OF PERONOSPORALES

The present invention relates to apparatus for detecting climatic conditions which favour the development of Peronosporales, for example, on vine leaves, and for indicating the optimum time for effecting a fungicidal treatment. In particular, the invention relates to apparatus of a form comprising:

sensor means for detecting conditions corresponding to a saturation or superficial dampness of plant leaves sufficient to allow the development of zoospores;

timer means connected to the sensor means and operative to output an "infestation" signal indicative of the occurrence of a Peronosporales infestation if the said conditions of saturation or of surface dampness of the leaves persist for a time period sufficient for the penetration of the zoospores into the stomata of the leaves; and monitoring means responsive to said infestation signal to monitor the speed of advance of the Peronosporales infestation indicated thereby as a function of the temperature and the humidity of the air, said monitoring means comprising a temperature sensor operative to provide an output signal indicative of the ambient air temperature, a humidity sensor operative to provide an indication of the ambient humidity, a pulsed signal generator connected to said temperature and humidity sensors and operative to generate a pulsed electrical signal the frequency of which is dependent on the ambient temperature and humidity, a monitor counter arranged in response to receipt of said infestation signal by the monitoring means to count the pulses output by the pulsed signal generator, and display means operable to provide a visual indication of the current count value held by the monitor counter.

It is known that infestations of Peronosporales (a form of mildew) are due to zoospores which are found on leaves lying on the ground. The zoospores germinate like seeds and, when germination has taken place, but before further development, the infestation of Peronosporales is termed "primary".

With each new rainfall the zoospores are dispersed and transported by the flow of water on the leaves and their stalks. Conditions necessary for a further development of the infestation are that there be a rainfall or dew of at least 0.1 mm (that is, the leaves are soaked by at least 0.1 mm of rain or dew) and that the consequent moisture remains on the leaves for a time period sufficient to allow the zoospores to penetrate into the stomata of the leaves (this time period is at least one hour). Once penetration by the zoospores has taken place, the infestation is termed "secondary".

Italian Patent Application No. 68565-A/78 filed in the name of FIAT S.p.A. and subsequently transferred to the present Applicant, describes apparatus of the form outlined above which is able to detect conditions favouring the commencement of the primary and the secondary infestations. This known apparatus, having detected the occurrence of conditions favourable to the commencement of secondary infestation, provides a visual indication of the advance of this infestation, as well as an indication of the optimum time for effecting a fungicidal treatment. By "optimum" time is meant the moment when the treatment will be most effective in terms of the number subsequent treatments required, minimisation of the number of treatments bringing about notable cost savings and a reduction of atmospheric pollution.

The speed of advance of a secondary infestation depends, as is known, on the ambient temperature and, consequently, the optimum moment for effecting the fungicidal treatment can vary substantially between about the fifth day and the fourteenth day starting from the commencement of the infestation. During this time period it is possible that the climatic conditions favouring the commencement of a new secondary infestation might reoccur one or more times leading to the superimposition of new infestations on that already taking place.

The apparatus described in the above-referred to Patent Application only permits the monitoring of a single secondary infestation at any one time.

This known apparatus also suffers from another disadvantage. As already mentioned, for the commencement of a secondary infestation it is necessary that there be a rainfall or dew of at least 0.1 mm and that the consequent surface dampness of the leaves lasts for a time period of at least one hour. More precisely, as is known, it is necessary that this surface dampness persists for a period of time which varies from a minimum of one hour to a maximum of four hours as a function of the ambient temperature. In fact, the zoospores require, in order to penetrate into the stomata of the leaves, about one hour if the ambient temperature is high, and a much greater time period in the event of lower values of ambient temperature. However, the apparatus described in the above mentioned Patent Application is arranged to indicate the commencement of a secondary infestation if the surface dampness of the leaves persists for a pre-established time period independent of the ambient temperature, and having a value intermediate between the said extreme values. Consequently, this apparatus cannot be considered reliable as there is significant risk that it will indicate the commencement of a secondary infestation when, in reality, no such infestation has occurred; conversely the apparatus may fail to indicate the commencement of an infestation which has in fact occurred.

The object of the present invention is to provide apparatus which will overcome the above-mentioned disadvantages of the prior art apparatus by providing for:

the possibility of detecting the occurrence of conditions which favour the commencement of one or more subsequent secondary infestations whilst a previously secondary infestation is still developing; and the possibility of estimating the penetration time of the zoospores into the stomata of the leaves as a function of the ambient temperature whereby to provide a more reliable indication of the initiation of a secondary infestation.

Accordingly, the present invention provides apparatus of the above-mentioned form, wherein the said timer means is so arranged that the duration of the time period timed thereby is a function of the ambient temperature, and wherein the apparatus further comprises:

auxiliary timing means operatively interconnected with said timer means and responsive to the generation of a said infestation signal to time a delay period during which the output of a further infestation signal is prevented, the timer means at the end of said delay period being arranged to be in a state ready to repeat its timing function for a further Peronosporales infestation, a plurality of further monitor counters, control means responsive to successively generated infestation signals from said timer means to cause successive ones of said monitor counters to start counting the pulses produced at the output of the pulsed signal generator, the counts of each counting monitor counter being indicative of the advance of a corresponding infestation detected by the apparatus; and output means operable to provide on said display means a visual indication of the counts of said monitor counters.

Figure 2:
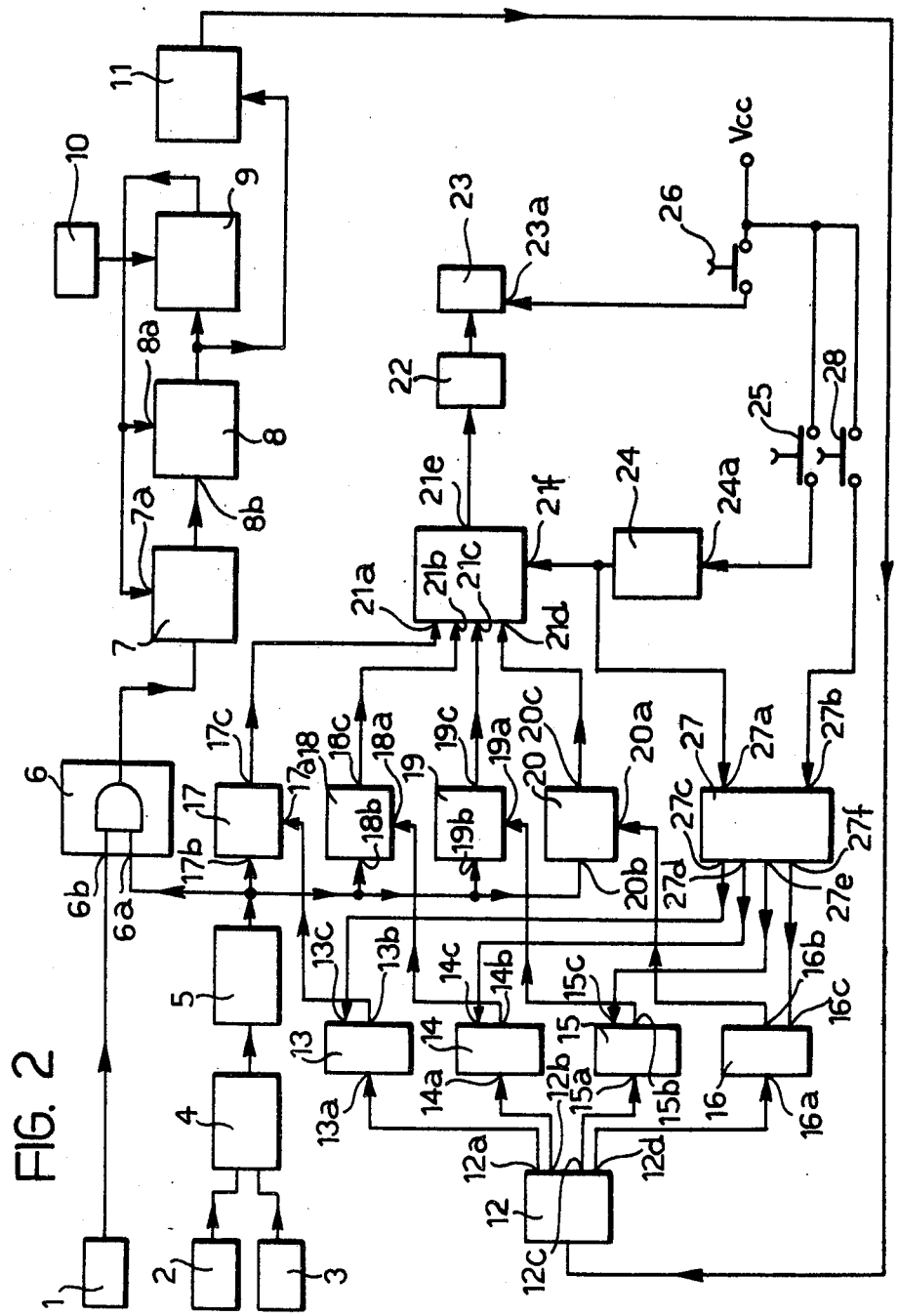

Apparatus embodying the invention will now be particularly described, by way of example, with reference to the accompanying drawings, in which:

FIG. 1 is a graph illustrating the relationship between ambient temperature T (in degrees centigrade) and the time t(expressed in days) required for a secondary infestation of Peronosporales to reach the optimum moment for treatment, curves A and B respectively showing this relationship for a value of atmospheric humidity lower and greater than 60%; and FIG. 2 is a block circuit diagram of the apparatus.

The apparatus now to be described is arranged to provide an indication of the advance of a secondary infestation of Peronosporales in vine leaves as a function of the climatic conditions prevailing; it should be noted that the apparatus is not intended to diagnose primary infestations since such infestations are easily identifiable by the operator.

As shown in FIG. 2, the apparatus comprises a sensor 1 for detecting a state of saturation or of surface dampness sufficient to allow the development of zoospores on the vine leaves. This sensor 1 is constituted for example by a printed circuit covered by a sheet of filter paper (for example, of the Whatman type) which can be readily replaced. In use of the apparatus, this printed circuit is disposed amongst the vines such as to be exposed to the rainfall or to the dew in the same way as the leaves of the vines. Typically, the printed circuit has two sets of conductive strips, the strips of one set being inter-placed with, and spaced from, the strips of the other set. Strips of the same set are connected to a common connecting track. The value of electrical insulation between the two connecting tracks provides an indication of the wetness of the sensor surface and this insulation value can be measured in a standard manner using a circuit including an operational amplifier.

As an alternative to being covered by a sheet of filter paper, the printed circuit can be covered with a layer of lithium chloride or other hygroscopic substance.

The apparatus further comprises a temperature sensor 2 for measuring the ambient temperature in the vine field. This sensor 2 can be constituted, for example, by an NTC (negative temperature coefficient) temperature sensitive resistor which has a value of 45KΩ at 25° C.

In addition, the apparatus is provided with a humidity sensor in the form of an adjustable threshold hygrostat 3, for example of the type having a pair of normally open contacts which close when the humidity of the air exceeds the set threshold value.

The temperature sensor 2 is connected to the amplifying input of an amplifier 4 which, for example, is constituted by a non-inverting amplifier including an operational amplifier. The hygrostat 3 is also connected to the amplifier 4 and is arranged upon closure of its contacts, to modify the transfer function of the amplifier 4.

The output of the amplifier 4 is connected to a voltage/frequency converter 5. This converter 5 is arranged to provide at its output a pulsed signal the frequency of which varies as a function of the amplitude of the voltage signal supplied from the amplifier 4. The output of the voltage/frequency converter 5 is connected to a first input 6a of a logic comparison circuit 6 constituted, for example, by a two input AND gate. A second input 6b of the logic circuit 6 is connected to the output of the sensor 1. The output of the logic circuit 6 is connected to the input of a binary counter 7 arranged to count pulses originating from the voltage/frequency converter 5. Pulses appearing at the output of the converter 5 are only allowed to pass through the logic circuit 6 to the counter 7 if an enabling signal is fed from the sensor 1 to the input 6b of the circuit 6, this enabling signal being generated by the sensor 1 only in the presence of conditions of saturation or of surface dampness of the vine leaves sufficient to allow the initiation of a secondary infestation of Peronosporales.

When the count effected by the counter 7 reaches a predetermined value, the counter 7 is arranged to output a signal to a "set" input 8b of a memory unit 8. The memory 8 serves to remember this signal until reset via its "reset" input 8a. The memory unit 8 is constituted, for example, by an R-S bistable latch.

In its 'set' state the memory unit 8 is arranged to output an "infestation" signal indicating the occurrence of a secondary infestation. This infestation signal is arranged to activate a timer 9.

A second temperature sensor 10 has its output connected to the timer 9 and is arranged to feed to the timer 9 voltage signals having an amplitude proportional to the ambient temperature. The timer 9, when activated, is operable after a delay period controlled by the temperature sensor 10, to provide a reset pulse to the reset inputs 7a and 8a respectively of the counter 7 and of the memory unit 8 to reset these units for purposes which will become clear hereinafter.

The infestation signal output from the memory unit 8 is also fed to a differentiation circuit 11 the output of which is connnected to the input of a counter 12. The differentiation circuit 11 provides at its output a short duration pulse whenever the output of the memory unit 8 changes to its set state. The counter 12 counts the pulses produced at the output of the differentiation circuit 11 and in the present example is a four cell ring counter.

The counter 12 is provided with four outputs 12a, 12b, 12c and 12d which are connected respectively to the "set" inputs 13a, 14a, 15a and 16a of four memories 13, 14, 15 and 16. In the present example each of the memories 13 to 16 is arranged to be triggered into a set state by the leading edge of a control signal applied to its 'set' input. The outputs 13b, 14b, 15b and 16b of the memories 13 to 16 are respectively connected to the "enable" inputs 17a, 18a, 19a and 20a of four counters 17 to 20.

These counters 17 to 20 are provided with respective count inputs 17b, 18b, 19b and 20b all of which are connected to the output of the voltage/frequency converter 5.

As will be more fully described hereinafter, upon the initiation of each secondary infestation, the memory unit 8 receives a pulse at its 'set' input 8b; consequently the output of the memory unit 8 changes state and the differentiation circuit 11 produces a pulse which causes the counter 12 to advance by one unit. As a result, the counter 12 outputs a pulse to the 'set' input of one of the memories 13 to 16. This pulse is remembered by the receiving memory which now feeds an enabling signal to the enable input of the corresponding counter 17 to 20; upon being enabled, this counter starts to count the pulses produced at the output of the voltage/frequency converter 5.

The outputs 17c, 18c, 19c and 20c of the counters 17 to 20 are respectively connected to the inputs 21a, 21b, 21c and 21d of a channel selector (multiplexer) 21. This channel selector 21 is provided with an output 21e connected to a decoder 22 which in turn is connected to a display 23; for example, the decoder 22 is of the BCD-7 segment type and the display 23 is a 7-segment display. The channel selector 21 is provided with a control input 21f connected to a counter 24. The counter 24 is arranged to be incremented by means of a control push button 25 interposed between an input 24a of the counter 24 and the electrical supply Vcc.

A control push button 26 is interposed between an input 23a of the 7 segment display 23 and the electrical supply Vcc. The channel selector 21 is arranged to provide at its output 21e the signals presented at a selected one of its inputs 21a to 21d, by the counters 17 to 20, the particular input selected being controlled by the output of the counter 24. To change the selected input, the counter 24 is incremented by operation of the push button 25. The decoder 22 operates to convert the signals received via the channel selector 21 from one of the counters 17 to 20, into a form suitable for the display 23. When the display 23 is energised by depression of the push button 26, the display segments light up to provide a visual indication of the contents of the counter selected by the channel selector 21 from the four counters 17 to 20; this visual indication is maintained for as long as the push button 26 is kept depressed.

The output of the counter 24 is also connected to one input 27a of a decoder circuit 27. A second input 27b of the circuit 27 is connected via a push button 28 to the electrical supply Vcc. The decoder circuit 27 is provided with four outputs 27c, 27d, 27e and 27f connected in that order to 'reset' inputs 13c, 14c, 15c and 16c respectively of the memories 13 to 16. Whenever the control push button 27 is depressed, the decoder circuit 27 is arranged to reset that one of the memories 13 to 16 which corresponds to the instantaneous contents of the counter 24.

Conveniently the control push buttons 25 and 28 can be replaced by a single 2-position switch operable to connect the electrical supply Vcc to the input 24a of the counter 24 when in its first position, and to the input 27b of the decoder circuit 27 when in its second position.

The operation of the apparatus will now be described.

The voltage/frequency converter 5 is supplied from the temperature sensor 2 (via the amplifier 4) with a voltage signal the amplitude of which is related to the instantaneous value of the ambient temperature. As a result, the voltage/frequency converter 5 outputs a pulse signal the frequency of which is related to the instantaneous value of the ambient temperature.

As can be seen in FIG. 1, the relationship (curves A and B) between the speed of advance of an infestation (expressed in days t to the optimum time for fungicidally treating the vines) and the ambient temperature T is non-linear. To take account of this, the relationship between the frequency of the converter output signals and the ambient temperature detected by the temperature sensor 2 must be correspondingly non-linear. For this purpose the amplifier 4 can be arranged to exhibit a non-linear gain characteristic, by the use, for example, of an operational amplifier with a suitable feedback network. Alternatively, or additionally, the desired non-linearity can be achieved by making use of non-linear portions of the transfer characteristic of the voltage/frequency converter 5.

The effect of the ambient humidity on the speed of advance of a secondary infestation can be seen from FIG. 1 in which the curves A and B refer to two different values of ambient humidity. The change in humidity between curves A and B manifests itself substantially as a translation of the infestation curve in a direction parallel to the time (t) axis. The FIG. 2 apparatus takes account of this effect by means of the hygrostat 3 which is arranged to vary the gain of the amplifier 4 as a function of the value of the ambient humidity.

When the vine leaves are saturated by at least 0.1 mm of rainfall or dew, the sensor 1 feeds an enabling signal to the input 6b of the logic circuit 6. As a result, the output pulses from the voltage/frequency converter 5 pass to the counter 7 which is arranged to count up to a predetermined number before generating an output pulse. It is clear that the higher the ambient temperature the quicker this predetermined count number will be reached. The generation of an output pulse by the counter 7 is indicative of the initiation of a secondary infestation.

With a simple calibration of the temperature sensor 2 and the hygrostat 3, and a suitable gain of the amplifier 4, it is possible to arrange for the counter 7 to reach the end of its count in a time variable between one hour (if for example, the ambient temperature is maintained at about 23°-24° C.) to four hours (if the ambient temperature is maintained at about 13°-14° C.).

The output pulse produced by the counter 7, causes the memory unit 8 to change state and output an 'infestation' signal which serves to activate the timer 9 controlled by the temperature sensor 10. After a delay period varying between three and four days in dependence on the ambient temperature, the timer 9 resets the counter 7 and the memory unit 8. Consequently if, during the delay period prior to resetting of the counter 7 and memory unit 8, the climatic conditions favouring the initiation of a new secondary infestation should reoccur, this infestation will be ignored by the apparatus which operates in accordance with the practical criterion of considering as a single secondary infestation all the infestations which might possibly be initiated within a period of time starting from the moment of detection of a first infestation to three to four days thereafter (depending on the ambient temperature). Subsequent to this period the apparatus is again enabled to detect the climatic conditions favouring the initiation of a new secondary infestation.

Each time the memory unit 8 changes from its 'reset' to its 'set' state, the corresponding change in the output of the unit 8 causes the differentiation circuit to produce a new pulse which indicates that the apparatus has detected the presence of conditions which favour the commencement of a new infestation. The counter 12 counts the pulses produced by the differentiation circuit 11.

The first infestation detected by the apparatus causes the differentiation circuit 11 to send a pulse to the counter 12 which results in the memory 13 being set to enable the counter 17 for counting the pulses produced at the output of the voltage/frequency converter 5.

If, after a period of time of at least three-four days, the conditions favouring a new infestation reoccur, the differentiation circuit 11 produces another pulse which causes the counter 12 to set the memory 14 into a state in which the counter 18 commences counting the pulses produced at the output of the voltage/frequency converter 5. Due to the provision of the memory 13, the counter 17 will remain enabled and continue counting the output of the converter 5.

In a similar manner, the counters 19 and 20 are respectively enabled at the start of third and fourth infestations without interrupting the counting of the counters 17 and 18.

Since the optimum time for effecting fungicidal treatment of a secondary infestation will be no later than about the fourteenth day after the start of the infestation, (even if the ambient temperature remains constantly low), and since also any infestation developing in a period of three-four days after the detection of a new infestation is considered to be part of that infestation, it is evident that the provision of four counters 17 to 20 will be sufficient to monitor all the secondary infestations which might develop in the period between detection and treatment of a particular secondary infestation.

With the channel selector 21 set to the counter 17-20 monitoring the most advanced infestation, pressing the control push button 26 will bring up on the display device 23 a numeral between "1" and "9" (if the display 23 is, for example, of the 7 segment type) which provides an indication of the speed of advance of the infestation. When the number "9" appears on the display 23 the optimum time for effecting the fungicidal treatment has arrived. Having effected this treatment the farmer operates the control push button 28 to deactivate the counter of the group of counters 17 to 20 which was monitoring the infestation just treated; thereafter the farmer presses the push button 25 to increment the counter 24. The channel selector 21 is now set to cause the display of information relating to the next most advanced infestation if such an infestation has occurred during the course of the preceding one. If no new infestation has occurred a zero will be brought up on the display device 23 upon depression of the push button 26.

We claim:

1. Apparatus for detecting climatic conditions favourable to the development of Peronosporales on plant leaves and for indicating the optimum time for effecting fungicidal treatment thereof, said apparatus comprising:

sensor means for detecting conditions corresponding to a saturation or superficial dampness of plant leaves sufficient to allow the development of zoospores;

timer means connected to the sensor means and operative to output an 'infestation' signal indicative of the occurrence of a Peronosporales infestation if the said conditions of saturation or of surface dampness of the leaves persist for a time period sufficient for the penetration of the zoospores into the stomata of the leaves, said timer means being so arranged that the duration of the time period timed thereby is a function of the ambient temperature;

auxiliary timing means operatively interconnected with said timer means and responsive to the generation of a said infestation signal to time a delay period during which the output of a further infestation signal is prevented, the timer means at the end of said delay period being arranged to be in a state ready to repeat its timing function for a further Peronosporales infestation; and monitoring means responsive to each said infestation signal to monitor the speed of advance of the Peronosporales infestation indicated thereby as a function of the temperature and the humidity of the air, said monitoring means comprising a temperature sensor operative to provide an output signal indicative of the ambient air temperature, a humidity sensor operative to provide an indication of the ambient humidity, a pulsed signal generator connected to said temperature and humidity sensors and operative to generate a pulsed electrical signal the frequency of which is dependent on the ambient temperature and humidity, a plurality of monitor counters, control means responsive to successively generated said infestation signals from said timer means to cause successive ones of said monitor counters to start counting the pulses produced at the output of the said pulsed signal generator, the counts of each counting monitor counter being indicative of the advance of a corresponding infestation detected by the apparatus, and output and display means operable to provide a visual indication of the current counts of said monitor counters.

2. Apparatus according to claim 1, including a second temperature sensor connected to the said auxiliary timing means and operative to cause the duration of said delay period to vary as a function of temperature.

3. Apparatus according to claim 1, wherein a total of four said monitor counters are provided, the apparatus further comprising a manually-operable control device operable to discontinue the counting being effected by any selected one of the said monitor counters.

4. Apparatus according to claim 3, wherein the said counter of the timer means is arranged to provide an output signal upon reaching a predetermined count value, said timer means further comprising a memory unit settable into first and second states respectively by said counter output signal and by the output of a reset signal from said auxiliary timing means upon completion of the timing of said delay period, said reset signal also serving to reset said counter of the timer means into its state in which it is ready to repeat its timing function, said memory unit when set into its first state being operative to output said infestation signal.

5. Apparatus according to claim 4, wherein the said control means comprises:

a differentiator connected to receive said infestation signal whereby to provide a pulse each time the said memory unit changes into its first state;

a plurality of memories each having an output connected to a respective monitor counter and each being settable into first and second states by control signals respectively received at 'set' and 'reset' inputs thereof, each said memory being arranged, when set into its first state to output an enabling signal to the monitor counter connected to it; and a counter arranged to count the pulses produced by the said differentiator and to output a said control signal to the set input of one of the said four memories in dependence on the current count of the counter.

6. Apparatus according to claim 5, wherein said manually operable control device comprises a counter with an associated manually-operable control for incrementing the counter, and a decoder circuit having a first input connected to the output of the said counter and a plurality of outputs connected to said reset inputs of the memories included in the said control means, the said manually-operable control device further comprising a second manually-operable control connected to a second input of the said decoder circuit, operation of said second control being arranged to cause the decoder circuit to output a said control signal to the reset input of a particular one of said memories as identified by the current count of the counter connected to the decoder circuit.

7. Apparatus according to claim 1, wherein said timer means comprises:
a temperature sensor operative to provide an electrical output signal of an amplitude proportional to the air temperature;
a voltage/frequency converter connected to the said temperature sensor and operable to provide a pulsed output signal of a frequency dependent on the amplitude of the signal fed thereto from the temperature sensor; and
a counter for counting the pulses output by the said voltage/frequency converter.

8. Apparatus according to claim 7, wherein the said temperature sensor and the said voltage frequency converter utilised in the said timer means are also used in the said monitoring means, the voltage/frequency converter forming part of said pulsed signal generator which further includes an amplifier connected between the said temperature sensor and the input of said converter, the gain of said amplifier being controlled by said humidity sensor.

9. Apparatus according to claim 7, wherein the said counter of the timer means is arranged to provide an output signal upon reaching a predetermined count value, said timer means further comprising a memory unit settable into first and second states respectively by said counter output signal and by the output of a reset signal from said auxiliary timing means upon completion of the timing of said delay period, said reset signal also serving to reset said counter of the timer means into its state in which it is ready to repeat its timing function, said memory unit when set into its first state being operative to output said infestation signal.

10. Apparatus according to claim 9, wherein the said control means comprises:
a differentiator connected to receive said infestation signal whereby to provide a pulse each time the said memory unit changes into its first state;
a plurality of memories each having an output connected to a respective monitor counter and each being settable into first and second states by control signals respectively received at 'set' and 'reset' inputs thereof, each said memory being arranged, when set into its first state to output an enabling signal to the monitor counter connected to it; and
a counter arranged to count the pulses produced by the said differentiator and to output a said control signal to the set input of one of the said four memories in dependence on the current count of the counter.

11. Apparatus according to claim 1, wherein said output and display means comprises a display, a channel selector having an output connected to the display and a plurality of inputs connected to respective ones of said monitor counters, and a manually-operable control device operable to cause the channel selector to intercommunicate a selected one of the monitor counters with said display.

12. Apparatus according to claim 11, wherein said manually-operable control device of the output and display means includes a counter the output of which is connected to a control input of the said channel selector, and a manually-operable control operable to increment said counter.

* * * * *